(12) United States Patent
Komissarov et al.

(10) Patent No.: US 10,984,610 B2
(45) Date of Patent: Apr. 20, 2021

(54) METHOD FOR INFLUENCING VIRTUAL OBJECTS OF AUGMENTED REALITY

(71) Applicant: DEVAR ENTERTAINMENT LIMITED, Nicosia (CY)

(72) Inventors: Andrei Valerievich Komissarov, p. Novaya Myza (RU); Anna Igorevna Belova, Tula (RU)

(73) Assignee: DEVAR ENTERTAINMENT LIMITED, Nicosia (CY)

(*) Notice: Subject to any disclaimer, the term of this patent is extended or adjusted under 35 U.S.C. 154(b) by 0 days.

(21) Appl. No.: 16/902,680

(22) Filed: Jun. 16, 2020

(65) Prior Publication Data

US 2020/0372723 A1 Nov. 26, 2020

Related U.S. Application Data

(63) Continuation-in-part of application No. 16/092,997, filed as application No. PCT/RU2017/050027 on Apr. 21, 2017, now abandoned.

(51) Int. Cl.
| | | |
|---|---|---|
| G06T 19/20 | (2011.01) | |
| G06K 9/00 | (2006.01) | |
| G06T 19/00 | (2011.01) | |
| G06K 9/46 | (2006.01) | |
| G06T 13/40 | (2011.01) | |

(52) U.S. Cl.
CPC .......... *G06T 19/20* (2013.01); *G06K 9/00671* (2013.01); *G06K 9/4652* (2013.01); *G06T 13/40* (2013.01); *G06T 19/006* (2013.01); *G06T 2219/2012* (2013.01)

(58) Field of Classification Search
CPC .............................. G06T 19/20; G06T 19/006
USPC ........................................................ 345/633
See application file for complete search history.

(56) References Cited

U.S. PATENT DOCUMENTS

| | | | |
|---|---|---|---|
| 2015/0023602 A1* | 1/2015 | Wnuk ................... | G06F 19/321 382/190 |
| 2015/0254903 A1* | 9/2015 | Sumner .................. | G06T 15/04 345/420 |

* cited by examiner

*Primary Examiner* — Shivang I Patel
(74) *Attorney, Agent, or Firm* — Nadya Reingand; Yan Hankin

(57) ABSTRACT

The present invention relates to methods for interacting with virtual objects comprising placing an flat image of an augmented reality object in the field of view of the video camera of the device for creating and viewing virtual objects of augmented reality, determining colors and recognizing patterns on the images received from the video camera device to create and view objects of augmented reality. Coloring the augmented reality object in accordance with the colors defined on the painted image obtained from camera devices. A correspondence is established between the patterns and colors of the painted image and actions of the augmented reality objects, depending on the color, color combination, pattern or colored pattern in the images obtained from the video camera of the device for creating and viewing the augmented reality objects.

16 Claims, 2 Drawing Sheets

METHOD FOR INFLUENCING VIRTUAL OBJECTS OF AUGMENTED REALITY

CROSS-REFERENCE TO RELATED APPLICATIONS

The present patent application is a Continuation-in-part of the U.S. application Ser. No. 16/092,997 filed Oct. 11, 2018 which claims priority to PCT application PCT/RU2017/050027 filed Apr. 21, 2017, which claims priority to Russian patent application RU2016115817 filed Apr. 23, 2016, all of which incorporated herein in their entirety.

TECHNICAL FIELD

The present invention represents a method for influencing virtual objects, wherein an unpainted flat image of an object of augmented reality is placed in the field of view of a video camera of a device for creating and viewing virtual objects of augmented reality, then painting the unpainted image of the object of augmented reality, determining colors from the image obtained from the video camera of the device for creating and viewing objects augmented reality, coloring the object of augmented reality in accordance with the colors determined from the painted image obtained from the camera of the device for creating and viewing augmented reality. Said method can be used, for example, in training facilities.

The following terms are used in this description:

Virtual object—created by technical means of object passed to man through his senses: vision, hearing and others.

Augmented Reality—perceived mixed reality created by using the "augmented" by the computer elements perceived reality (where virtual objects are mounted in the perceptual field).

Device adapted to create and view objects of augmented reality—any computing device having a complete display and a video camera, which can transmit the display image from the camera in real time and display additional virtual image. A typical representative of such a device: smartphone, tablet computer, a computer with a headset in the form of points of augmented reality, such as Google Glass etc.

Smartphone (eng. smartphone—smart phone)—cell phone, complete with the functionality of a Pocket PC.

BACKGROUND ART

Currently, an increasing number of people use various electronic devices and interacting with virtual objects. This happens not only in games but also in the learning process, as well as, for example, when a remote trade of goods, a buyer decides to purchase using a virtual model of the goods. In this case, the most promising direction of development is the creation of augmented reality—that is, the combination of a virtual or augmented reality virtual objects along with a real image obtained in real time from the video camera of the device shown on the display of computer device or a smartphone.

In addition to simply observing the objects of augmented reality, there is a need to interact with them, that is, using various means to send control signals, which lead to the object of the augmented reality reacting to the effect.

There is a known method of influencing the virtual augmented reality objects, wherein the object of augmented reality is painted in colors corresponding to the colors of a painted plane image corresponding to said object of augmented reality. For example, a student takes a sheet of paper with an image of an animal, paints it in color. And then watching colored drawing through a smartphone or augmented reality glasses, while he sees a three-dimensional image of the same animal, painted in exactly the colors that he used to paint the image.

There is a There is known method of influencing virtual objects of augmented reality, wherein:

An unpainted image of an object of augmented reality is located in the field of view of a video camera of device for creating and viewing virtual objects of augmented reality, the unpainted flat image of the object of augmented reality is painted, colors used to color the flat image of the object of augmented reality are determined by means of the device for creating and viewing objects of augmented reality from images taken from video camera of the device for creating and viewing objects of augmented reality, the object of augmented reality is colored in the colors corresponding to the colors determined from the painted image received from the camera of the device means for creating and viewing objects of augmented reality.

This state of the art disclosed in the publication of Oct. 3, 2015 in the article "Augmented reality for the conversion of colorings in a three-dimensional experience," is available at: https://i-look.net/programs/augmented-reality-for-making-coloring-3d-experience.html This method is the closest in technical essence and attainable technical result and selected as a prototype of the invention.

The disadvantage of this prototype is that it is impossible to control the actions or movements of the object of augmented reality, depending on the color, color combination and/or patterns in which the corresponding flat image of this object is painted. Indeed, for any variant of painting an object of augmented reality identical and differ only in their color, action or movement of such an object does not change.

SUMMARY

Based on this original observation, the present invention mainly aims to provide a method of influencing virtual objects of augmented reality, which allows to address at least one of the drawbacks mentioned above, namely, to provide a capability to control various sequences of actions of the object, its parts or interaction scheme of the object as a character augmented reality using colors and/or patterns used to color flat image of said object of augmented reality, which is the technical problem addressed.

In order to achieve this goal, the following steps are performed:

a. forming a database of various sequences of actions objects augmented reality prior to painting the picture of the object of augmented reality, the database may be located on the mobile communication device or on the server and the data from the server can be communicated to the mobile communication device via any wireless communication network, b. establishing beforehand a correlation between the color, pattern or color combination of the painted picture and a particular sequence of actions of the objects of augmented reality, c. receiving at least one digital image or image video frame of a flat image from a video camera of a user device where an object is drawn, said user device adapted to creating and viewing objects of augmented reality, d. recognizing the object on the received flat image by matching it to a reference image e. depending on the colors, combination of colors or patterns of the image obtained from the video camera of the device, activate a certain action or sequence of actions of the object of augmented reality from database of sequences of actions of the objects of augmented reality according to the established correlation.

Due to these advantageous features it is possible to control the augmented reality objects by coloring their corresponding flat image. Depending on the color, the object will perform the actions corresponding to the specified color, combination of colors or patterns.

The sequence of actions of the augmented reality object can be determined by a pattern used to color the flat image. For example, certain parts of the image can be colored in patterns for example stars, stripes, dots or the like of a certain color. Such pattern can be recognized on the image and the sequence of actions of the augmented reality object can be invoked based upon the pattern recognized and its color or color combination.

There is an embodiment where the sequence of actions of the augmented reality object can be determined by recognizing a real world object that is appearing on the digital image or video team captured by the camera of the user communication device. For example, a simple object as an apple can be recognized and the corresponding sequence of actions can be invoked on the virtual object. In this case the database would include corresponding sequences of actions of the virtual objects related to possible recognised objects f the real world.

There is an embodiment of the invention wherein the selection of the sequences of actions of the augmented reality objects is carried out on the basis of the prevailing color on the images obtained from the video camera of the device to create and view the augmented reality objects Thanks to this favourable feature there is a capability appears to specify one of the variants of the algorithm, using which it is possible to solve the problem of determining which course of action of the augmented reality object to activate, if the flat image is painted in different colors. In this embodiment, the object of augmented reality will always act in accordance with color prevailing in the flat image.

There is also an embodiment of the invention in which the colorable flat image is further divided into fragments, each fragment puts in correlation with an element of an object of augmented reality, prior to starting coloring a fragment of the flat image of the object of augmented reality, forming a database of various sequences of actions of elements of the objects of augmented reality and establishing correspondence between the color of the colored fragment of the image and one of sequences of actions of elements of the objects of augmented reality and, depending on the color of the fragments obtained from the camera of the device to create and view objects augmented reality, activate one or another action of the element of the object of augmented reality different from the base of sequences of actions of elements of augmented reality objects, according to the correspondence established for the fragments.

Thanks to these advantageous features there is a possible to specify an alternate version of the algorithm by which it will be possible to determine a course of action for the augmented reality object to activate, if the image is painted in different colors or combination of colors or various patterns colored differently are used on the image. In this embodiment, the combined action of an object of augmented reality is shall be a superposition of the actions of individual elements of augmented reality objects.

There is another embodiment of the invention in which the color transformation of the flat image of the augmented reality object is additionally applied to a color scheme having three numerical components: color tone, saturation and brightness.

Thanks to this advantageous feature, it becomes possible to more clearly match the actions of the augmented reality object depending on the color tone, saturation and brightness.

There is also an embodiment of the invention in which the saturation parameter of the fragments of the painted flat image is additionally determined and signals provided to the user that the fragment is not colored in a situation where the saturation of the fragments of the painted flat image is less than a specified value.

Thanks to this advantageous feature, it becomes possible to indicate to the user that he forgot to paint some fragment of the flat image. There is among other things an embodiment of the invention in which algorithms for improving the quality of a painted flat image (automatic white balance, automatic tone balance) are used.

Thanks to this advantageous characteristic, it is possible to make the image of the augmented reality object brighter and more saturated than the real colors on the painted image.

BRIEF DESCRIPTION OF THE DRAWINGS

Other features and advantages of the present invention clearly follow from the description given below for illustration and not being limiting, with reference to the accompanying drawings in which.

Figure 1:
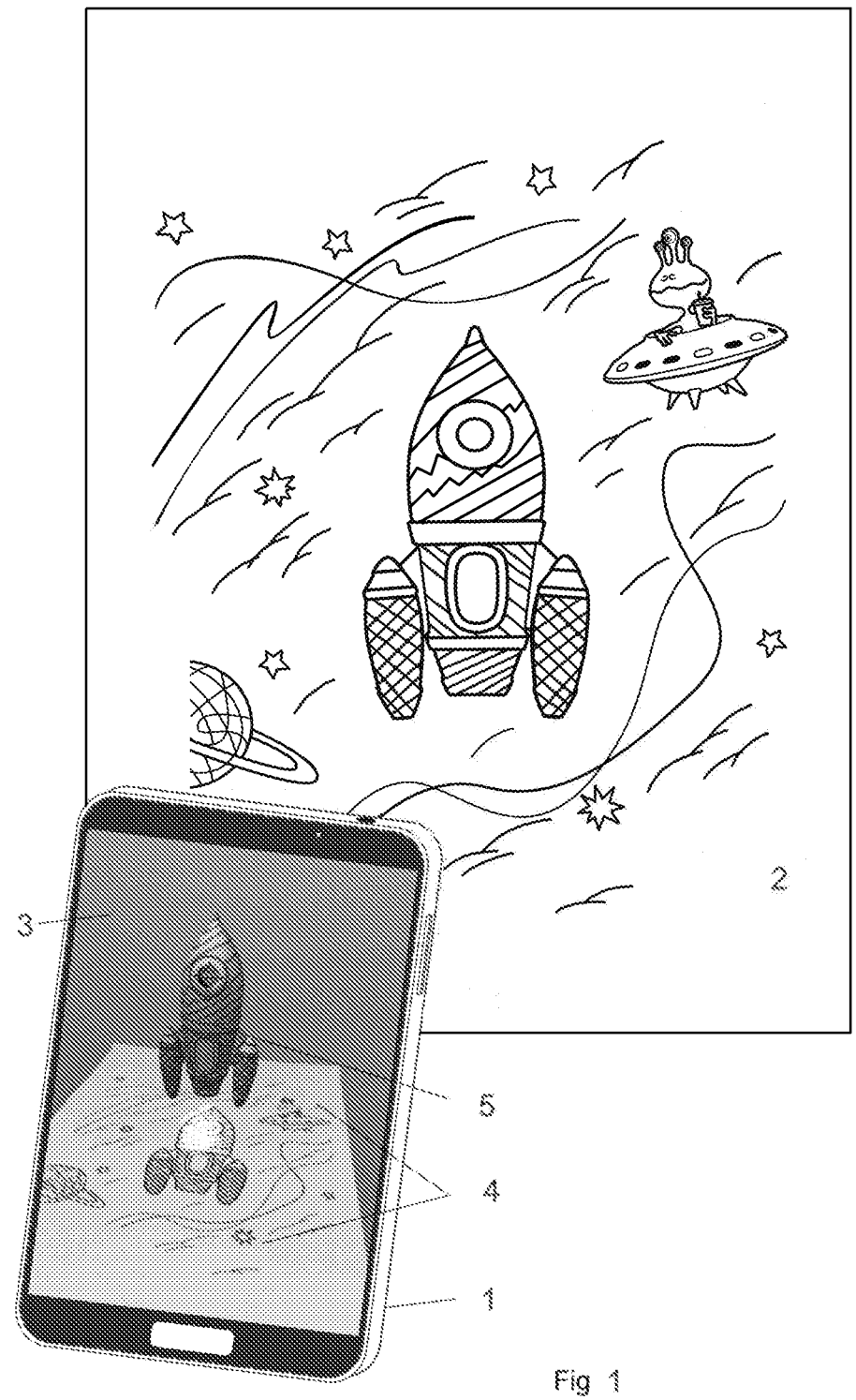
FIG. 1 shows a schematic diagram of an apparatus for influencing virtual augmented reality objects according to the invention, FIG. 2 schematically shows the steps of a method for influencing virtual objects of augmented reality according to the invention, FIG. 3 schematically depicts yet another embodiment of the steps of the method for influencing virtual objects of the augmented reality according to the invention.

According to FIG. 1, the device for influencing the virtual reality objects of augmented reality is a smartphone 1 whose video camera is aimed at the colored image 2 and on the display 3 of which the painted image, position 4 is shown. According to the color of the painted image, the display shows the virtual object of augmented reality 5, corresponding to image 2, painted in the same colors.

IMPLEMENTATION OF THE INVENTION

The method for influencing virtual objects of augmented reality works as follows. The most exhaustive example of the implementation of the invention is provided, bearing in mind that this example does not limit the application of the invention.

Figure 2:
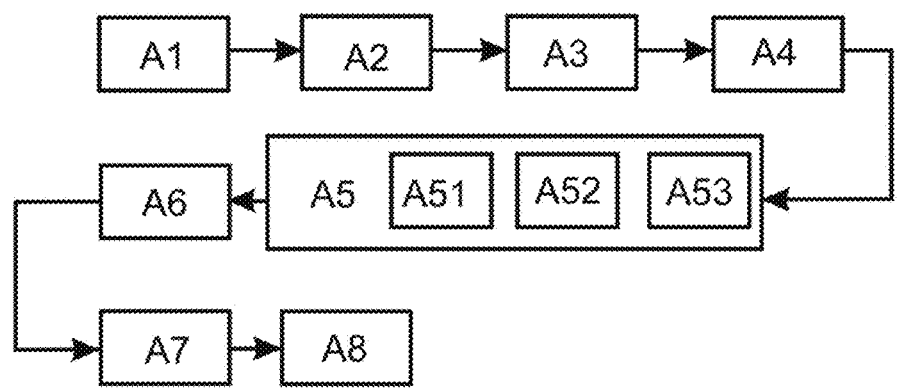
Figure 3:
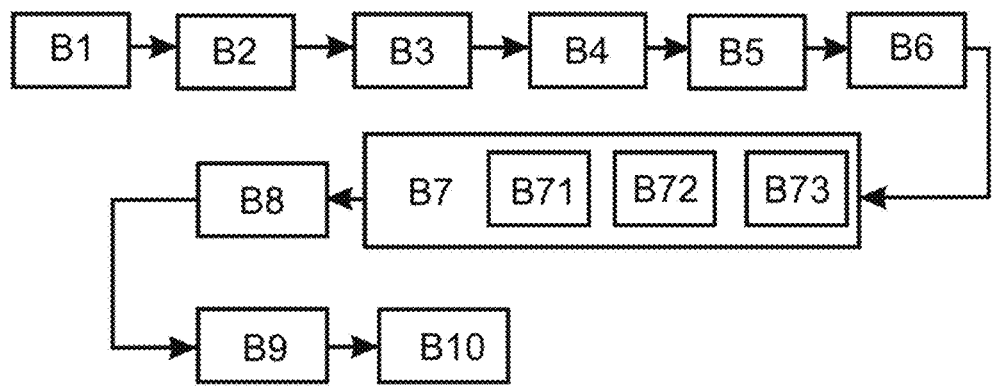

According to FIG. 2:

EXAMPLE 1

Step A1. Forming a database of various sequences of actions of objects of the augmented reality. Certain sequences of actions may represent different emotions of an object or different reactions of the object.

Step A2. In advance, a correlation is established between the colors, combination of colors or patterns of the painted flat image and variants of the actions of the object of the augmented reality.

Step A3. Coloring the flat image with different colors and\or patterns.

Step A4. The flat image of the object of augmented reality is placed in the field of view of the video camera of device to create and view virtual objects augmented reality.

Step A5. Colors and patterns of the images obtained from the video camera of the device to create and view objects of augmented reality are determined and/or recognized by the means of the device.

Step A 51. Additionally, conversion of colors of the flat image of the object of augmented reality image is performed to the color scheme having a numerical three components: hue, saturation and brightness.

Step A 52. Additionally, a saturation parameter is determined fir fragments of the painted flat image, and user is notified that the fragment is not colored in a situation where the saturation of the fragments of the flat image is below a specified parameter.

Step A 53. Algorithms are used to improve the quality of the painted flat image. For this purpose can be used a linear correction of brightness and contrast, power (gamma) correction, and whether the logarithmic correction, as well as algorithms that aligns the image illumination, while maintaining local contrast in poorly lit areas and bright, and automatic white balance, auto tone and balance, or any other algorithm to improve the quality of the painted flat image.

Step A6. Coloring of the object of augmented reality is performed in accordance with the colors and/or patterns defined in the painted image from the video camera on the device to create and view augmented reality.

Step A7. Depending on the colors, combination of colors and/or patterns of the images obtained from the camera of the device for creating and viewing the augmented reality objects, an action is activated on the object of augmented reality selected from the database of sequences of actions augmented reality objects, according to the established correspondence.

Step A8. The choice of the sequence of actions of the augmented reality objects is carried out on the basis of the dominant determined color, combination of colors, pattern or combination of pattern and colors, or pattern of a certain color in the images obtained from the video camera device for creating and viewing the augmented reality objects.

EXAMPLE 2

Step B1. The flat image is split into fragments.
Step B2. Each fragment is put in correlation with an element of the object of augmented reality.
Step B3. Before starting painting of the fragment of the flat image of the object of augmented reality forming database of various workflows elements augmented reality objects.
Step B4. Establishing correspondence between the colors or patterns of the fragments of the painted image and actions of elements of the object of augmented reality.
Step B5. Coloring the flat image with different colors and\or patterns.

Step B6. Placing the colored the flat image of the object of augmented reality is placed in the field of view of the video camera of device for creating and viewing virtual objects augmented reality.

Step B7. The color and/or patterns of the images of the fragments are determined and/or recognized from the images obtained from the video camera of the device for creating and viewing objects augmented reality.

Step B71. Additionally, the color transformation of the flat image of the fragments of the augmented reality object is converted into a color scheme having three numerical components: color tone, saturation and brightness.

Step B72. Additionally, the saturation parameter of the fragments of the painted flat image is determined and the user is alerted that the fragment is not colored in a situation where the saturation of the fragments of the painted flat image is below the specified parameter.

Step B73. Using algorithms to improve the quality of the painted flat image (auto white balance, autotone).

Step B8. The coloring of the elements of the augmented reality object is made in accordance with the colors and/or patterns defined on the fragments of the painted image obtained from the camera of the device to create and view the augmented reality.

Step B9. Depending on the color, color combination and/or patterns on the fragments of images obtained from the camera of the device to create and view objects augmented reality, certain action of the element of the augmented reality object is activated from the database of different sequences of actions of elements of the augmented reality objects, according to the established correspondence.

Step B10. The selection from the sequences of actions of the elements of the augmented reality objects is carried out on the basis of the determined color, combination of colors, pattern or combination of pattern and colors, or pattern of a certain color of the fragments of images obtained from the camera of the device for creating and viewing objects of augmented reality.

The important step in the process is recognising the object depicted on the flat image that is being scanned, photographed or recorded on video by the camera of the device. The digital image captured by the camera is analysed in order to recognize the object on the flat page and its colorings, including, possibly patterns used. Also a real life object can be recognized. The efficiency and preciseness of recognition of the object and patterns is instrumental to the implementation of the present invention in order to take advantage of the mechanism of interpretation of the color schemes of the object and thereby define its behaviours as an augmented reality object. Also, real life objects like an apple that are captured by the camera of the user device can be recognized and used as a trigger to reactions of the virtual object.

In accordance with the present invention, the object recognition, especially in the case when the received 2D image is distorted, for example the sheet of paper that is being scanned is bended or curved, can include processing received image with a SLAM (Simultaneous localization and mapping) algorithm. SLAM algorithms are known in the art and widely used in navigation, robotic mapping and odometry for virtual reality or augmented reality. An ORB-SLAM algorithm is also known in the art as a versatile and accurate SLAM solution for monocular, stereo and RGB-D cameras. It is being used in the art to compute in real-time the camera trajectory and a sparse 3D reconstruction of the scene in a wide variety of environments, ranging from small hand-held sequences of a desk to a car driven around several city blocks.

According to the present invention, the feature-based ORB-SLAM algorithm can be used for image processing using sparse point cloud. A feature is a certain combination of pixels in a 2D image that is characterized by a set of parameters that allow to define it in different lighting conditions, scale and angle of view. Using ORB-SLAM algorithm, object features are extracted from the sequence of images coming from the camera. Further, using a bundle adjustment algorithm, object features received from one or more frames are arranged in a 3D space, while simultaneously setting the location of the camera.

While the use of ORB-SLAM algorithms is known in the art, typically a single feature detector used is ORB (Oriented FAST and Rotated BRIEF). The algorithm ultimately belongs to the class of so-called feature-based. ORB-SLAM builds a sparse point cloud. Features may be represented by a combination of pixels that may comprise various types of corner, edge, and maxima shapes.

However, the known implementations of the ORB-SLAM algorithms are very computationally intensive and despite all the advantages of this algorithm, its use on mobile devices is not possible in most cases, since even on high-performance devices the resources are often insufficient to ensure adequate speed of the ORB-SLAM algorithm.

The present invention addresses this technical problem and proposes an advantageous solution that allows to improve the efficiency of the texturizing process and therefore allows to use the ORB-SLAM algorithm on mobile devices by reducing computational intensity of the overall process. In order to achieve these advantages, a system of preliminary image processing is implemented. Said preliminary image processing allows to identify the most promising areas for detecting object features on the images coming from the camera. In order to implement this solution, FAST (Features from Accelerated Segment Test) descriptor search algorithms can be used. As a result of an image being processed by FAST algorithm, a set of so-called FAST points, is generated.

According to the present invention, a subset of the FAST points identified by FAST algorithm can be selected as interest points. Interest points can be identified with a comparison framework and taxonomy for affine covariant interest point detectors. The covariant refers to the elliptical shape of the interest region, which is an affine deformable representation. Scale invariant detectors are represented well in a circular region. Maxima region and blob detectors can take irregular shapes. According to the present invention, interest points selected from identified FAST points based upon described criteria, where the number of interest points is not greater than certain threshold. Said threshold can be set as an algorithm parameter. Based upon said interest points a specific, a certain predetermined number of features can be detected, and said detection is done by using the advantageous approach of the present invention, only within the most promising areas as described in more details below (using DHOFR and DHOOFR algorithms).

Once said features are detected, they are being cut out, while remembering the position of this area in the original image and then the data indicating the detected areas is being transferred to the ORB-SLAM algorithm for processing.

Once the ORB-SLAM algorithm finds the position of the camera in 3D space and detects features relative to this camera location, the original image can be fixed relative to the fragments taken earlier from said image relative to the position of the camera in 3D space.

When features are determined, a key points within the features can be selected and used in the process of texturizing. The features and their key points are used for improving positioning of the camera with an offset relative to the coordinates of the vertices of the texture coordinate mapping. That is, if a texture coordinate (UV) mapping is a grid, it would be a flat projection of a 3D object onto the texture. If the key points of the image and the vertices of the texture coordinate mapping do not coincide, but it the location of the features within the reference image is known, the coordinates are adjusted accordingly to the relative displacement of the features to the vertices of the texture coordinate mapping. When adjusting the image, the position of the features transformed relative to the position of the UV vertices according to a pre-prepared template. Using the features allows to recognize patterns and colors of certain areas of the image and apply them to the augmented reality object even if the received image is distorted, such as if an image is obtained by taking a picture of a curved or concave sheet. If it is required to make necessary changes to the geometry of the object during the construction of the 3D model, especially when the coordinates of the vertices changes and it needs to be accounted for the UV texture that will also change.

A novel and advantageous algorithm Dynamic HOFR-SLAM, or DHOFR-SLAM, developed based upon known FAST detector and a DHOFR descriptor algorithms. As one of the aspects of the present invention the known HOOFR algorithm has been greatly improved by providing a DHOOFR algorithm as follows:

Algorithm DHOOFR or Dynamic Hessian ORB—Overlapped FREAK (Fast Retina Keypoint) designed to use FAST points on an image pyramid, as will be appreciated by a skilled person. The DHOOFR algorithm is a descriptor algorithm of the FREAK class of algorithms. Algorithms of this class use a distribution similar to that of the human retina, wherein the size of the viewed window increases with distance from the center. The density of points decreases exponentially with distance from the center.

While FREAK class descriptor algorithms work great with pyramidal detectors (like ORB) and space-scale SURF (Speeded-Up Robust Features) detectors, the advantageous solution of the present invention, DHOOFR algorithm, provides a modification to adapt the HOOFR descriptor to apply the FAST points approach to the original acquired image in a more robust way. According to the advantageous approach, once FAST points have been identified on the image, their subset forms a set of interest points are selected, as described above. The next iteration of processing to find the next set of FAST points is done only in the most promising area that is defined around each interest point with a certain radius using descriptor scaling factor.

With each iteration (to a certain threshold of iterations) the radius around the interest points is reduced by a scaling factor. During experiments performed with the descriptor, it was determined that the optimal scaling factor coefficient is $\sqrt{2}$. When scaling factor coefficient of $\sqrt{2}$ is used and FAST points are found with a threshold of 35 iterations in the original image, greater repeatability of the result is achieved, i.e. the ratio of stable points to newly found is approximately 70%. Since some points of the image are removed by the proposed coefficient, the descriptor created on the same image scale will be successfully matched with the descriptor of the image with reduced resolution (or density).

Another advantageous improvement to the known algorithms is using the Shi-Tomasi score instead of the Hessian score when selecting interest points. Due to the modification of the descriptor for working with FAST key points, the point estimation method used in the original HOOFR is no longer suitable. Calculation of responsiveness of a point using Hessian matrix allows the detector to select only those points that point to the blob regions of the image. This estimate is not suitable for the mentioned modification, since FAST points have better repeatability at corners in the image. The method of Shi-Tomasi allows to improve the selection of such points. The algorithm is based on the principles of calculating Harris angles, but differs in calculating the response measure: the algorithm directly calculates the value R=min $(\lambda_1, \lambda_2)$, since it is assumed that the search for angles will be more stable.

Another advantageous improvement to the known algorithms is using 47 oriented descriptor pairs. The known HOOFR algorithms typically use 40 oriented pairs, using 47 oriented descriptor pairs allows to cover all the critical orientation angles of the descriptor created on the FAST points. Thus, an improvement in the accuracy of match descriptors is achieved, while the speed is reduced only slightly. According to the known algorithms, the regular FAST point with one pyramid matches within 8 degrees of a point's rotation, whereas using 47 pairs to orient the descriptor allows to cover an angle of 7.6 degrees, preventing the descriptor from falling into the "dead zone" where it cannot be recognized.

Using the advantageous approach discussed above the transformation coordinate matrix is generated. The transformation matrix is used to convert the coordinates of the photo image into coordinates of the object of augmented reality.

This approach provides significant improvements when recognizing and applying to the virtual object patterns of the flat image that is not in optimal conditions. In such cases it is necessary to compare the contours and key points of texture coordinates with key points in images (based upon determined object features) that are in an unpredictable state of curvature. In the case there is a rotation of an object, or the object is distorted due to a large slope, its position can be normalized and brought to an original form using simple mathematical algorithms, but if the object is a picture on a curved sheet, it has a distorted position with respect to the camera (located at an angle), then standard methods are not suitable.

To solve the technical problem of achieving correct distribution of the resulting image relative to UV mapping the newly developed DHOFR-SLAM algorithm can be used. The essence of the approach of the DHOFR-SLAM algorithm is that the object features are detected in the reference image first, and then the vertices of the UV grid are attached to the coordinates of the detected features (or their key points), wherein vertices of the UV grid being put in correlation to the features. Subsequently, the image areas specified by the detected features are being distorted relative to the coordinates of the UV vertices, the image then being corrected based upon detected object features in relation to the corresponding UV vertices.

Recognition is performed by comparing the digital image of the object with its reference image, also stored in the memory of the mobile communication device, and considering the image recognized when the threshold value of the correlation coefficient of the photo-image and one of the reference images is exceeded or using other known recognition algorithms.

After recognizing the object, colors and recognized patterns applied to the virtual object based on the values of the coordinate transformation matrix and data interpolation.

With these advantageous techniques it is possible not only to recognize the object, but also to recognize patterns of the object is colored in patterns, making it possible to do that using a regular user device such as a smartphone.

Obviously, the estimation of the color in which this or that fragment of the image is colored implies a color comparison rather than a point comparison, but an approximate evaluation of the correspondence of the detected color to a definite fixed set.

The critical moment here is the choice of the color model in which the comparison will be made. Most of the images in modern computing devices are stored in the RGB model—where each color is decomposed into three components (red-blue-green) and in this form is recorded. But such a model does not look convenient enough in our situation. The most attractive are the models HLS and HSB, which store the color also in the form of three numerical components, but these components describe the color tone, saturation and brightness.

In this form, the color data is optimally suited for analysis—in color tones (in fact, one can understand the color tone as a point on the rainbow) you can determine the color of the marker or pencil used for coloring, saturation allows for a fixed threshold (for example, 0.5) allows you to determine whether the area is painted, or it can be a feature of lighting (paper with room lighting often 25 gleams red).

The brightness component can be used in various ways—and to distinguish light blue from dark blue, and to cut off "uninteresting" colors for us—such as white and black (the original colors of an unpainted flat image).

It is also advisable to avoid mistakes in the estimation of illumination by means of white balance algorithms, with a spot (at the brightest point) or multiple (based on, for example, the edges of a scanned sheet of paper) by measurement.

Multiple measurement in an obvious way will give the best quality, because the scanned sheet of paper is not always illuminated evenly. Optimum the solution can look like a weighted metering across the entire scanned area, then building an irradiance map, clearing it of noise and compensating it, to get the image of the scanned page closest to reality.

In all the examples for placing the augmented reality objects on real objects (for example, on a table), the following operations are also performed:
  a. Identify the markers of real three-dimensional space from the images obtained from the device's video camera to create and view the augmented reality. In general, a marker can be any figure or object. But in practice, we are limited to allowing the webcam 10 (phone), color rendering, lighting and computing power of the equipment, since everything happens in real time, and therefore must be processed quickly, and therefore usually select a black and white marker of simple form.
  b. Form a physical base coordinate system tied to the spatial position of the markers of a real three-dimensional space.
  c. Specify coordinates of the three-dimensional virtual objects of the augmented reality in the base coordinate system.

d. Determine the coordinates of the device to create and view the augmented reality relative to the base coordinate system by means of image analysis from the camera of the device.

The sequence of steps is exemplary and allows one to rearrange, subtract, add, or perform some operations simultaneously without losing the ability to interact with virtual objects.

The example of implememeting the method may be a paper coloring book. A user would color the picture, for example an image of an animal or a robot or the like with different colors and using certain patterns. Each page has an image that can be recognized as a virtual object when picture of the page is taken by a device, such as a smartphone running a corresponding software application. The book may include description of the object and describe its behaviour depending on colors or patterns used for its coloring. For example, a cat in a hat that is colored using pattern of green stars is fast and active, and a cat in a hat colored with a pattern of blue dots is slow and lazy and sleeps a lot. The application would recognize the object depicted on the book page and determine colors used for its colorings and recognize patterns. The virtual object of the augmented reality would be shown to the user on the screen of the smartphone. The object would act in accordance with the colorings used by the user to color the picture in the coloring book.

The virtual object of augmented reality may be also programmed to react to certain colors or objects that get in view of the camera of the smartphone. The reaction may also depend on the coloring or patterns used to color the picture. For example, a robot colored in green color may dance when a green apple is captured by the camera of smartphone, and a robot colored in red reacts to a red apple.

INDUSTRIAL APPLICABILITY

The proposed method of influencing virtual objects of augmented reality can be implemented by a specialist in practice and, when implemented, ensures the realization of the claimed assignment, which allows 30 to conclude that the criterion of "industrial applicability" for the invention is met.

In accordance with the present invention, a prototype of a device implementing the proposed method is manufactured. Testing the prototype showed that it provides the ability to:
coloring the object of augmented reality or an element of such an object into the color of a flat image,
determining the colors and/or patterns of the painted flat image,
defining in the database of the sequences of actions of the object of the augmented reality corresponding to a certain color, combination of colors, pattern and recognized object of real world,
executing the specified sequence of actions corresponding to a particular color by the object of augmented reality.

The database may be located on the mobile communication device or on the server and the data from the server can be communicated to the mobile communication device via any wireless communication network.

IMPLEMENTATION EXAMPLE 1

A virtual dragon, created as an augmented reality object, dances in a stylized way, if colored pink. And when painted predominantly in blue dragon is fighting a boy. If the dragon has green dots painted on his body, the dragon likes green apples—when a green apple gets in view of the camera of the device, depicting the dragon, the dragon smells the apple and asks to give it to him.

IMPLEMENTATION EXAMPLE 2

Created as an object of augmented reality, a virtual fictitious animal when colored lip color on a flat image in a bright red color sends an air kiss.

IMPLEMENTATION EXAMPLE 3

See FIG. 1. The virtual rocket created as object 15 of the augmented reality takes off or explodes depending on the painted color.

Thus, in the present invention, the stated object is achieved: to provide the ability to control various sequences of actions of the augmented reality object with the help of the color gamut of the painted flat image of the augmented reality object.

The invention claimed is:
1. A mobile communication device (1) adapted to create and display virtual objects (5) of augmented reality, comprising:
a camera adapted to capture a digital image of a flat image (2) and pass said digital image to a computing means, where the flat image is a contour pattern for coloring,
a display (3) adapted to show an output of the camera and the virtual objects of augmented reality,
the computing means, adapted to:
process the digital image to recognize a virtual object (5) corresponding to the one depicted on the flat image (2),
process the digital image to recognize a pattern drawn on the flat image (2),
process the digital image to determine colors in which the flat image (2) is painted,
form a 3D model of the recognized virtual object (5),
output to the display (3) said 3D model of the corresponding virtual object (5), colored in accordance with how the corresponding flat image (2) is colored, wherein the 3D model is animated,
cause said animated 3D model of the virtual object (5) to perform an action or a sequence of actions from a virtual objects action database corresponding to the color determined on the digital image, a combination of the colors determined on the digital image or the recognized pattern of the digital image, wherein the virtual objects action database is a database that includes virtual object actions and action sequences, wherein each said action and action sequence corresponds to a color, a combination of colors, a pattern or a colored pattern;
wherein forming the 3D model of the recognized virtual object (5) comprises forming a transformation matrix for mapping coordinates of the acquired image with coordinates of the 3D model; said transformation matrix formed as follows:
determining FAST points on the digital image;
determining a first subset of interest points based upon determined FAST points;
define most promising areas based upon the determined first subset of interest points;
determine object features on the acquired image by performing n iterations of:

determining $n^{th}$ set of FAST points on the digital image within the most promising areas;

determining $n^{th}$ set of interest points on the digital image based on the $n^{th}$ set of FAST points;

forming $n^{th}$ most promising areas for detecting object features of the object on the digital image; said most promising areas are being reduced by a scaling factor;

determining coordinates of the object features on the acquired image based upon $n^{th}$ most promising areas selected.

2. The mobile communication device (1) according to claim 1, wherein the color includes a color scheme including three numerical components: color tone, saturation and brightness.

3. The mobile communication device (1) according to claim 1, which is further adapted to:

split the flat image (2) into fragments, put in correspondence an element of a virtual object (5) to each fragment of the flat image (2), determine a color and recognize a pattern of each fragment, activate an action of the virtual object (5) based on the correspondence between the color, pattern or colored pattern of the fragment of the flat image (2) and the sequence of actions of elements of the augmented reality object in said database of actions of the virtual objects of augmented reality.

4. The mobile communication device (1) according to claim 3, which is further adapted to determine a color saturation of the fragments of the flat image, and to signal to a user that the fragment is not colored, if the fragment saturation is less than a specified parameter.

5. The mobile communication device (1) according to claim 3, which is further adapted to use algorithms, including automatic white balance and automatic tone balance to improve coloring quality of the virtual reality object (5).

6. The mobile communication device (1) according to claim 1, wherein the computing means further adapted to:

use said transformation matrix mapping coordinates of sections of the digital image, said sections comprising colors and patterns to corresponding sections of the 3D model; and paint corresponding sections of the 3D model using colors and patterns of the corresponding sections of the digital image.

7. The mobile communication device (1) according to claim 1, wherein the computing means of the mobile communication device (1) adapted to further recognize objects of real world that have been captured by the camera of the mobile communication device (1), and wherein the virtual objects action database further includes virtual object actions and action sequences corresponding to the recognized objects of the real world.

8. The mobile communication device (1) according to claim 7, wherein the computing means of the mobile communication device (1) adapted to invoke actions of the virtual object (5) based upon the recognized object of real world that has been captured by the camera of the mobile communication device (1).

9. A method for forming and manipulating virtual objects of augmented reality, including the steps of:

forming a virtual objects action database including virtual object actions and action sequences, wherein each said action and action sequence corresponds to a color, a combination of colors, a pattern or a colored pattern, coloring a flat image of a contour drawing with colors or patterns, capturing a digital image of the flat image (2) by a camera of a mobile communication device (1), processing by a computing means of the mobile communication device (1) the digital image to recognize a virtual object (5) corresponding to the one depicted on the flat image (2) by the computing means of the mobile communication device (1), processing by the computing means of the mobile communication device (1) the digital image to recognize a pattern drawn on the flat image (2), processing by the computing means of the mobile communication device (1) the digital image to determining colors in which the flat image (2) is painted, forming by the computing means of the mobile communication device (1) a 3D model of the recognized virtual object (5), said 3D model is animated, outputting to a display of the mobile communication device (1) said animated 3D model of the corresponding virtual object (5), colored in accordance with how the corresponding flat image (2) is colored, by the computing means of the mobile communication device (1) causing said animated 3D model of the recognized virtual object (5) to perform an action or a sequence of actions from the virtual objects action database corresponding to the color determined on the digital image, a combination of the colors determined on the digital image or the recognized pattern of the digital image;

wherein forming the 3D model of the recognized virtual object (5) comprises forming a transformation matrix for mapping coordinates of the acquired image with coordinates of the 3D model; said transformation matrix formed as follows:

determining FAST points on the digital image;

determining a first subset of interest points based upon determined FAST points;

define most promising areas based upon the determined first subset of interest points;

determine object features on the acquired image by performing n iterations of:

determining $n^{th}$ set of FAST points on the digital image within the most promising areas;

determining $n^{th}$ set of interest points on the digital image based on the $n^{th}$ set of FAST points;

forming $n^{th}$ most promising areas for detecting object features of the object on the digital image; said most promising areas are being reduced by a scaling factor;

determining coordinates of the object features on the acquired image based upon $n^{th}$ most promising areas selected.

10. The method according to claim 9, wherein the color includes a color scheme including three numerical components: color tone, saturation and brightness.

11. The method according to claim 9, further comprising:

splitting the flat image into fragments, putting in correspondence an element of the virtual object (5) to each fragment of the flat image, determining a color and recognize pattern of each fragment, activating an action or sequence of actions of the virtual object (5) based on the correspondence between the color, pattern or colored pattern of the fragment of the flat image and the action or sequence of actions in said database of actions of the virtual objects of augmented reality.

12. The method according to claim 11, further comprising determining a color saturation of the fragments of the flat image, and to signal to a user that the fragment is not colored, if the fragment saturation is less than a specified parameter.

13. The method according to claim 11, further comprising using algorithms, including automatic white balance and automatic tone balance to improve coloring quality of the virtual object (5).

14. The method according to claim 9, further comprising:
using said transformation matrix mapping coordinates of sections of the digital image, said sections comprising colors and patterns to corresponding sections of the 3D model; and
painting corresponding sections of the 3D model using colors and patterns of the corresponding sections of the digital image.

15. The method according to claim 9, further comprising recognizing objects of real world that have been captured by the camera of the mobile communication device (1), and wherein the virtual objects action database further includes actions and action sequences corresponding to the recognized objects of the real world.

16. The method according to claim 15, further comprising invoking action or sequence of action of the virtual object (5) based upon recognized object of real world that has been captured by the camera of the mobile communication device (1).

* * * * *